United States Patent

Lubischer et al.

[11] Patent Number: 5,752,750
[45] Date of Patent: May 19, 1998

[54] VALVE ARRANGEMENT

[75] Inventors: Frank Lubischer, Boppard; Thomas Wald, Hollnich, both of Germany

[73] Assignee: Lucas Industries public limited company, West Midlands, United Kingdom

[21] Appl. No.: 586,684

[22] PCT Filed: Jul. 12, 1994

[86] PCT No.: PCT/EP94/02282

§ 371 Date: Mar. 25, 1996

§ 102(e) Date: Mar. 25, 1996

[87] PCT Pub. No.: WO95/03197

PCT Pub. Date: Feb. 2, 1995

[30] Foreign Application Priority Data

Jul. 21, 1993 [DE] Germany .................. 43 24 533.1

[51] Int. Cl.[6] .................................................. B60T 8/36
[52] U.S. Cl. .................................. 303/119.2; 303/113.1
[58] Field of Search ..................... 303/119.2, 113.1, 303/119.1; 137/627.5, 625.65, 596.17; 251/129.15

[56] References Cited

U.S. PATENT DOCUMENTS

| | | | |
|---|---|---|---|
| 4,526,203 | 7/1985 | Leiber | 303/119.2 X |
| 4,596,273 | 6/1986 | Kiyoshima | |
| 5,218,996 | 6/1993 | Schmitt-Matzon | 303/119.2 X |
| 5,332,304 | 7/1994 | Maas | 303/119.2 X |

FOREIGN PATENT DOCUMENTS

| | | |
|---|---|---|
| 0492109A1 | 11/1991 | European Pat. Off. . |
| 1650574 | 9/1970 | Germany . |
| 2036110 | 1/1972 | Germany . |
| 3506287A1 | 8/1985 | Germany . |
| 3831426A1 | 4/1989 | Germany . |
| 3832023A1 | 3/1990 | Germany . |
| 4112136A1 | 10/1992 | Germany . |
| 1004134 | 9/1965 | United Kingdom . |

Primary Examiner—Lee W. Young
Attorney, Agent, or Firm—Wood, Herron & Evans, L.L.P.

[57] ABSTRACT

A valve arrangement, particularly for a fluid brake circuit with anti-slip control, comprising a first, a second and a third fluid connection (16, 20, 46) of respective, predetermined flow cross-sections, at least one valve element (44) which is biased by a first spring arrangement (106) in a first position in which the first and second fluid connection (16, 20) are communicating via a flow path and the third fluid connection (46) is closed, and a valve actuating means (42) by which the valve element (44) can be moved in order to assume a second position in which the first and third fluid connection (16, 46) are communicating via a flow path and the second fluid connection (20) is closed, with the bias of the first spring arrangement (106), the force that can be applied to the valve element (44) by the valve actuating means (42), and the flow cross-sections of the fluid connections (16, 20, 46) being so dimensioned that with a predetermined fluid pressure at the second fluid connection (20), the valve element (44) opens the second fluid connection (20) to such an extent that a flow path is obtained to the first and/or the third fluid connection (16, 46).

10 Claims, 4 Drawing Sheets

VALVE ARRANGEMENT

The present invention relates to a valve arrangement, particularly for a fluid brake circuit with anti-slip control, comprising a first, a second and a third fluid connection of respective, predetermined flow cross-sections, at least one valve element which is biased by a first spring arrangement in a first position in which the first and second fluid connection are communicating via a flow path and the third fluid connection is closed, and a valve actuating means by which the valve element can be moved in order to assume a second position in which the first and third fluid connection are communicating via a flow path and the second fluid connection is closed.

EP-0492109 A1 describes a non-return valve with a consumer-side valve seat and a pressure generator-side closing element which through magnetic force effect is capable of acting upon an armature at the valve seat. A compression spring is arranged between the armature and the closing element. In the closed valve position, this imparts a closing force on the closing element, which is adapted to the response pressure. In this manner, a non-return valve and a pressure limiting valve are implemented in one valve unit. From DE-3832023 it is known to provide differently biased non-return valves as safety valves counter parallel to an ASC switching solenoid valve. These non-return valves are, however, formed as separate assemblies.

From DE-4112136 A1, a unit comprising a pressure limiting valve and a switching valve for a hydraulic braking system with a locking protection and a traction control means is known. The unit comprises a guide tube formed from a housing jacket with a solenoid accommodated therein for an armature which is accommodated therein in a longitudinally movable manner. The guide tube is closed at both ends by respective yoke members. The first yoke member comprises a first connection of the switching valve. This eccentrically arranged connection communicates with the inner space of the guide tube. The first yoke member additionally comprises the third connection of the switching valve, which extends coaxially to the longitudinal axis of the guide tube. This third connection terminates in a first valve seat. The second yoke member is provided with the centrally arranged second connection of the switching valve. This second connection communicates internally with a second valve seat.

The armature of the switching valve has a tubular shape and comprises an internal collar at the side of the second yoke member. A reset spring which is formed as a helical compression spring bears against this internal collar and acts upon the second yoke member. The armature accommodates two disks which are permeable to a pressure medium and between which a spring which is formed as a helical compression spring is arranged coaxially with the longitudinal axis. The spring is subjected to a biasing force due to which the first disk bears against a stop ring inserted in the armature and the seconds disk bears against the internal collar. On the side of the first yoke member a ball serving as a first closing member is attached to the first disk. The first closing member in cooperation with the valve seat of the first yoke member forms a first seat valve of the switching valve. At the second disk of the armature a similar ball serving as a second closing member is arranged on the side of the second yoke member. In cooperation with the valve seat of the second yoke member, the closing member forms a seat valve both of the switching valve as well as the pressure limiting valve.

This arrangement comprises a relatively great number of parts, and its manufacture is complicated.

Consequently, it is the object of the invention to design a valve arrangement, particularly for a fluid brake circuit with anti-slip control, which is simpler and comprises fewer components.

In addition, this valve arrangement is intended to limit the pressure generated by a pump for braking at least one spinning vehicle wheel in the case of an activated anti-slip control with the aid of simple means in such a manner that a maximum permissible system pressure is not exceeded and simultaneously the master cylinder and/or a compensating tank is closed against a pressure build-up.

To solve this object, the initially mentioned valve arrangement is further developed by the features of the characterizing clause of claim 1.

In such a valve, the closing force is overcome upon exceeding a limit pressure, and the valve opens so that a further pressure increase is no longer possible. Prior to reaching the limit pressure, the pump pressure side is closed against the first valve connection.

In a fluid braking circuit with an anti-slip control (ASC or TC for traction control), a braking pressure is built up during an acceleration phase of the vehicle independent of the brake pedal pressure for braking the spinning vehicle wheel. This provides for an improvement of the torque distribution via the differential gear. This results in an increase of the maximum drive moments that can be transmitted to the road surface as a function of the wheel-road surface contact.

The required fluid pressures are built up by the integrated ABS pump and supplied to the fluid braking circuit. The required pressures for matching the torque values of the wheels amount to preferably 60 bar max. Since the pump, however, is capable of providing a considerably higher pressure compared to the maximum pressure of 60 bar, it is reasonable to limit the excess pressure in the TC case by a corresponding apparatus.

This means that the ASC, TC pressure must be available to a certain extent (approx. 60 bar), i.e. that is must not be relievable via the master cylinder. On the other hand, the excess fluid volume produced by the pump is to be fed into a suitable reservoir.

For the reduction of the required installation space and for the simplified assembly the invention provides for a combination of the two valve functions, limiting of the maximum pressure and closing of the master cylinder in a single valve arrangement.

Advantageous embodiments of the valve arrangement as well as a hydraulic vehicle braking system which comprises the valve arrangement according to the invention are the subjects of additional claims.

A preferred embodiment of a valve arrangement according to the invention and a fluid braking circuit comprising the valve arrangement according to the invention are described more detailed in the following description with reference to the drawings.

Figure 1:
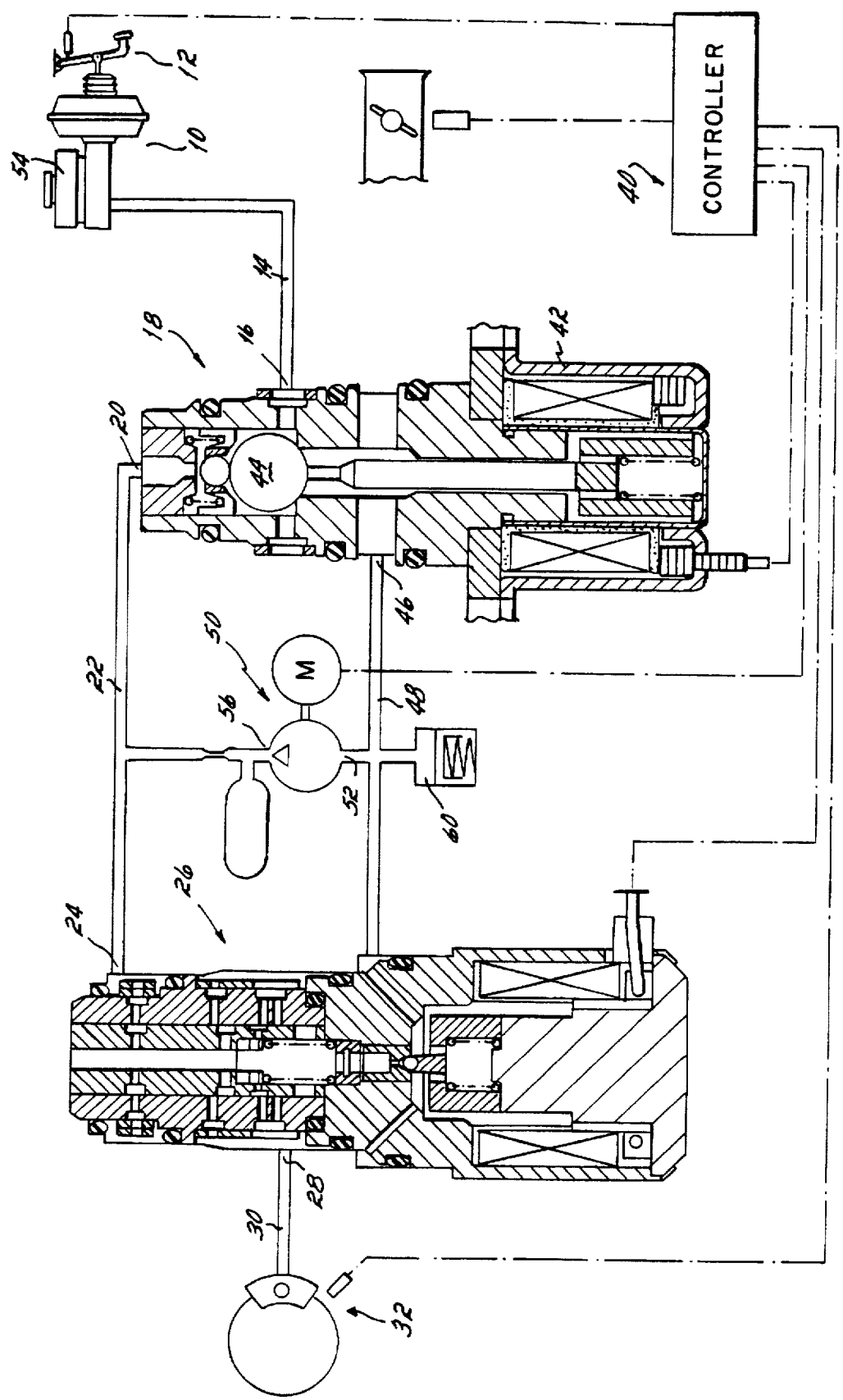
FIG. 1 shows a schematic connection diagram a fluid braking circuit with a wheel anti-block system and a wheel anti-slip control.

FIG. 1 shows a hydraulic fluid braking system with a wheel anti-block system and a wheel anti-slip control. A master cylinder 10 is actuatable by a pedal 12, and a fluid line 14 leads from the master cylinder 10 to a first fluid connection 16 of a valve arrangement 18 which is designed as a 3-way solenoid valve. In the non-actuated condition of the valve arrangement 18 a flow path exists from the first fluid connection 16 to a second fluid connection 20, from where a fluid line 22 leads to a first fluid connection 24 of a pressure reducing solenoid valve 26. In the non-actuated condition of the pressure reducing solenoid valve 26 a flow path exists to a third fluid connection 28 of the pressure reducing solenoid valve 26 from where a fluid line 30 leads to a wheel brake 32.

Normally, the above-described fluid flow path represents the direct pressure connection between the master cylinder 10 and the wheel brake 32.

If an anti-slip control case occurs an ABS-ASC controller 40 turns on the valve arrangement 18, i.e. its electromagnet arrangement 42 is triggered and a valve member 44 is shifted so that the first and second fluid connection 14, 20 are no longer communicating via a flow path, but a flow path is made between the first fluid connection 16 and a third fluid connection 46. This interrupts the direct connection between the master cylinder 10 and the wheel brake 32, and the master cylinder 10 is now communicating via a fluid line 48 with a pump 50 or its suction connection 52, respectively, via the fluid line 14, the first fluid connection 16 and the third fluid connection of the valve arrangement 18.

The pump 50 which in the ASC case is activated simultaneously with the valve arrangement 18 can now suck in fluid via the valve arrangement 18 and the previously described path from a fluid tank 54 through the opened non-actuated master cylinder 10 and build up fluid pressure at the pump outlet 56 or in the fluid line 22, respectively. The fluid pressure then increases both at the first fluid connection 24 of the first pressure reducing solenoid valve 26 as well as at the second fluid connection of the valve arrangement 18. The pressure increase at the second fluid connection 20 of the valve arrangement 18 counteracts as closing force the axial component of the magnetic force generated by the electromagnet arrangement 42. Due to the existing pressure and area conditions in the valve arrangement 18, a maximum possible pressure of approx. 60 bar results in the fluid line 22. If this pressure is exceeded, the valve element 44 clears the second fluid connection 20 so that the overpressure fluid can escape both via the first fluid connection 16 into the master cylinder 10 or a fluid tank 54 arranged above it as well as into an expander 60 via the third fluid connection 46 and the fluid line 48. The dimensioning of the individual components will be explained further below.

In this manner, the maximum possible pressure in the fluid line 22 is effectively limited.

Figure 2:
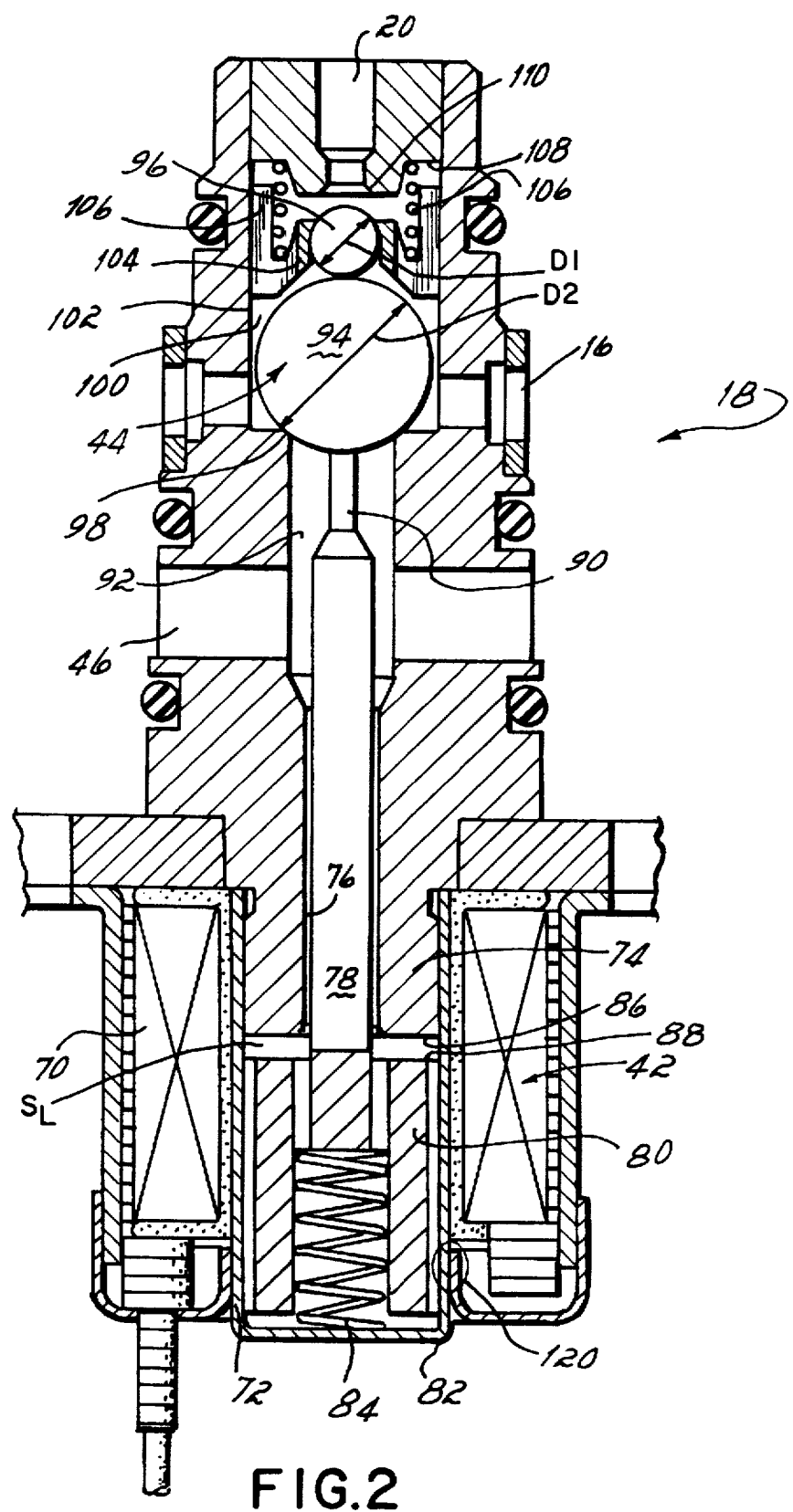
FIG. 2 shows a schematic cross-sectional view of a valve arrangement according to the invention.

FIG. 2 shows an enlarged view of the valve arrangement 18, where previously mentioned parts of the valve arrangement are provided with the same reference numerals as in FIG. 1 so that their repeated description can be omitted.

The valve arrangement 18 has an essentially cylindrical shape, with the second fluid connection 20 opening into one end face (FIG. 2, top), while the first fluid connection 16 and the fluid connection 46 open radially at different heights into the outer wall of the valve arrangement 18.

The electromagnet arrangement 42 is arranged opposite the second fluid connection 20 (in FIG. 2 at the bottom end of the valve arrangement 18).

The electromagnet arrangement 42 comprises an excitation coil 70 which is housed in an iron jacket 72. An excitation winding 70 is designed as pot coil, into a cylindrical recess of which an iron core 74 with a coaxial throughhole 76 projects. The through-hole 76 accommodates an axially movable plunger armature 78 which expands at its end projecting into the interior of the pot coil 70 to the inner diameter of the pot coil 70 by an essentially hollow cylindrical iron body 80. The plunger armature 78 bears against a bottom plate 82 of the valve arrangement with a helical spring 84 arranged in the interior of the hollow cylindrical body 80.

An air gap $S_L$ of variable height is formed between a face 86 of the iron core 74 projecting into the interior of the pot coil 70 and an opposite face 88 of the hollow cylindrical body 80.

At an end 90 remote from the electromagnet arrangement 42, the plunger armature 78 extending through the throughhole 76 projects into a valve chamber 92. The end 90 of the plunger armature 78 contacts the valve element 44 which is formed from two balls 94 and 96 with different diameters.

In the (shown) rest position of the valve arrangement 18 the ball 94 with the greater diameter rests on a valve seat 98 so that the flow between the first fluid connection 16 and the third fluid connection 46 is interrupted. The ball 94 is housed in an essentially hollow cylindrical valve chamber 100, the diameter of which is so selected that an annular gap remains between the surface of the ball 94 and a wall 102 of the valve chamber, through which fluid can flow from the first fluid connection 16 to the second fluid connection 20.

The ball 96 with the smaller diameter is arranged coaxially to the plunger armature 78 and the ball 94 with the greater diameter and rests immediately on the ball 94 with the greater diameter. The ball 96 with the smaller diameter is kept in a cage 104 which is supported by a helical spring 106 against an upper inner end wall 108 of the valve arrangement 18. The second fluid connection 20 with a valve seat 110 is formed in the end wall 108 in a coaxial alignment with the two balls 94, 96, with the ball 96 with the smaller diameter lifted off the valve seat 110 in the (shown) rest position of the valve arrangement 18 so that a continuous flow path between the first fluid connection 16 and the second fluid connection 20 is obtained.

The ball 96 with the smaller diameter is pressed to contact the ball 94 with the greater diameter by the helical spring 106 so that a defined valve opening in the area of the second fluid connection is obtained.

The following dimensioning rules are intented for the defined adjustment of the closing or holding forces, respectiveley, with the electromagnet arrangement 42 in the excited condition, whereby temperature and voltage variations should be eliminated, if possible.

Because a current regulation of the actuation signal of the electromagnet arrangement 42 is not provided, it is not possible to use a proportional magnet. The adjustment of the magnetic forces can thus be achieved only via the air gap $S_L$ and/or a defined material selection or geometric design, respectively.

Figure 3:
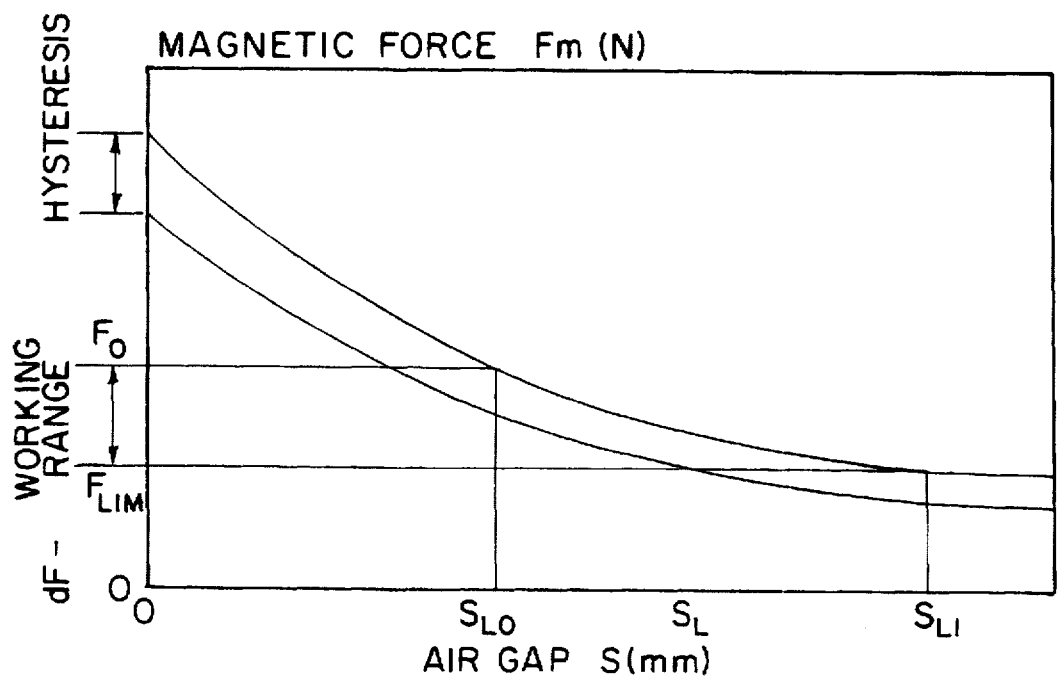
FIG. 3 is a graph with the magnetic force of an electromagnet arrangement being plotted as a function of the air gap width.
Figure 4:
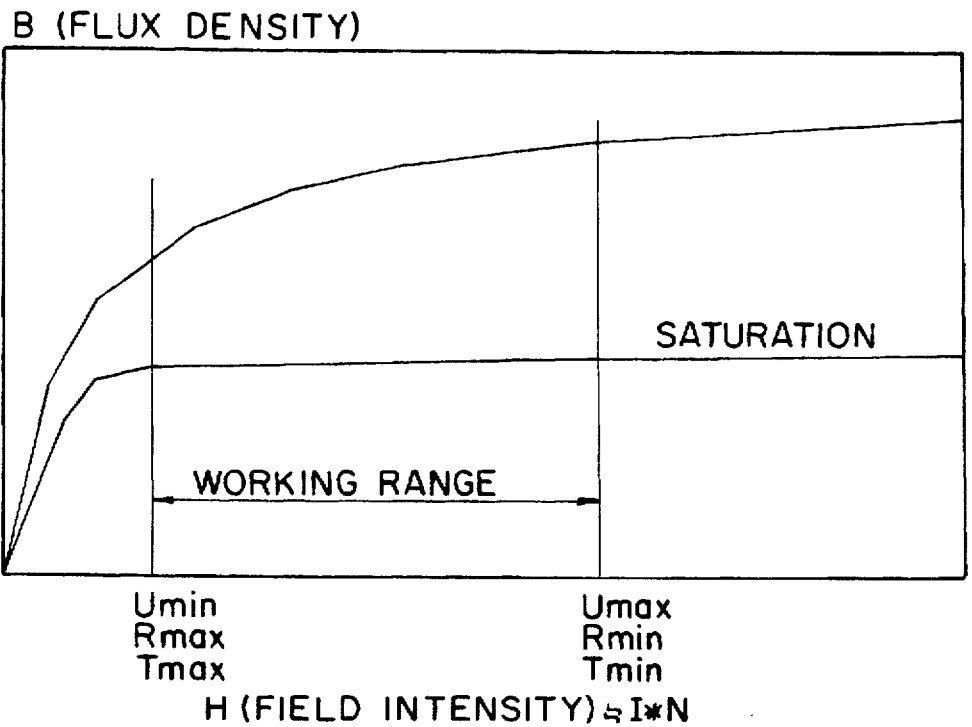
FIG. 4 is a graph with the flux density in an electromagnet arrangement being plotted as a function of the field intensity.

In FIGS. 3 and 4 the magnetic force Fm as a function of the height of the air gap $S_L$ or the flux density B as a function of the field intensity H, respectively, are plotted.

As shown in FIG. 3, the magnetic force increases superproportionally from an air gap $S_{LO}<S_L$. This means that in the range 0 . . . $S_{LO}$ even very small gap changes result in a superproportional increase of the magnetic forces so that the gap tolerances for adjustment must be correspondingly close.

In order to increase the adjustment tolerances it is now proposed to utilize that range of the air gap $S_L$ in which a constant or at least only slightly increasing change of the the magnetic force ($S_{LO}<S_L<S_{L1}$) is used as the gap dimension. Within this curve section, variations of the air gap (tolerance) influence the applied magnetic forces only slightly.

For the purpose of reducing the temperature and voltage sensititivity of the electromagnet arrangement 42 in the valve arrangement, reference is now made to the graph of FIG. 4.

The temperature and voltage insensitiveness can be achieved by a saturation of the magnetic circuit. In a magnetic circuit the magnetic flux (product of field intensity and area) is constant in any point. It is therefore possible by introducing a material which is conductive for the magnetic flux into the magnetic circuit at any point, e.g. at a point identified by reference numeral 120 in FIG. 2, to saturate the magnetic circuit.

Upon saturation of the magnetic circuit, a function progress of the magnetic induction B against the magnetic excitation H (I) according to FIG. 4 is obtained. If the electromagnet arrangement 42 is operated in the essentially constant range of FIG. 4, the temperature influence can almost completely be eliminated, because here the magnetic circuit is always saturated. The lower working range thereby results from the minimum voltage ($U_{min}$), the maximum resistance ($R_{max}$) and the maximum temperature ($T_{max}$). The upper working range analogously results from the maximum voltage ($U_{max}$), the minimum resistance ($R_{min}$) and the minimum temperature ($T_{min}$).

With these data the response point of the valve arrangement 18 can be established under consideration of the spring forces of the springs 84 and 106 and the dimensions of the valve seats 98 and 110 in which the displacement of the valve element 44 caused by the electromagnet arrangement 42 is overcome by a pressure prevailing at the second fluid connection 20 to such an extent that the ball 96 with the smaller diameter is forced off its valve seat, while the ball 94 with the greater diameter has not yet fully returned to its valve seat 98 so that the valve chambers 92 and 100 and thus all three fluid connections 16, 20 and 46 of the valve arrangement 18 are communicating via flow paths.

The following situation will be present with respect to the hydraulic braking system according to FIG. 1.

In the currentless condition of the electromagnet arrangement 42 the valve member 44 is in the normal braking and anti-block braking position. The helical coil 106 keeps the two balls 94 and 96 and the plunger armature 78 in the rest position, in which the ball 94 with the greater diameter is seated on its valve seat 98, and the ball 96 with the smaller diameter clears the valve seat 110. This provides for a flow path between the first fluid connection 16 and the second fluid connection 20 and a connection of the master cylinder 10 with the brake 32 via the valve 26, while the fluid connection 46 to the fluid expander 60 and the fluid pump 50 is closed.

Upon current supply to the excitation coil 70 (anti-slip control case) an axial force is generated at the armature 78 via the electromagnet arrangement 42. This force is capable of shifting the two balls 94 and 96 against the force of the helical spring 106 so that the ball 96 with the smaller diameter comes into contact with its valve seat 110, while the ball 94 with the greater diameter is lifted off its valve seat 98. This clears the connection between the master cylinder 10 and the pump 50. The pump 50 can then suck in fluid from the fluid tank 54 via the master cylinder 10 and deliver it into the fluid line 22, which increases the pressure at the fluid connection 20. This pressure prevailing at the fluid connection 20 produces a hydraulic counterforce which attempts to lift the ball 96 with the smaller diameter off its valve seat 110 against the force of the electromagnet arrangement 42.

Due to the dimensioning of the valve areas, the spring forces and the magnetic forces, the hydraulic force at the fluid connection 20 after exceeding a certain level is sufficient to lift the ball 96 with the smaller diameter off its valve seat 110. As soon as this situation occurs fluid will flow to the first and third fluid connection 16, 46 and will be sucked in by the pump 50 until the overpressure is relieved. The pressure at the second fluid connection 20 will break down immediately, and the magnetic force can close the valve seat 110 again. This opening and closing operation will be repeated continuously in a kind of "shuttle movement".

Figure 5:
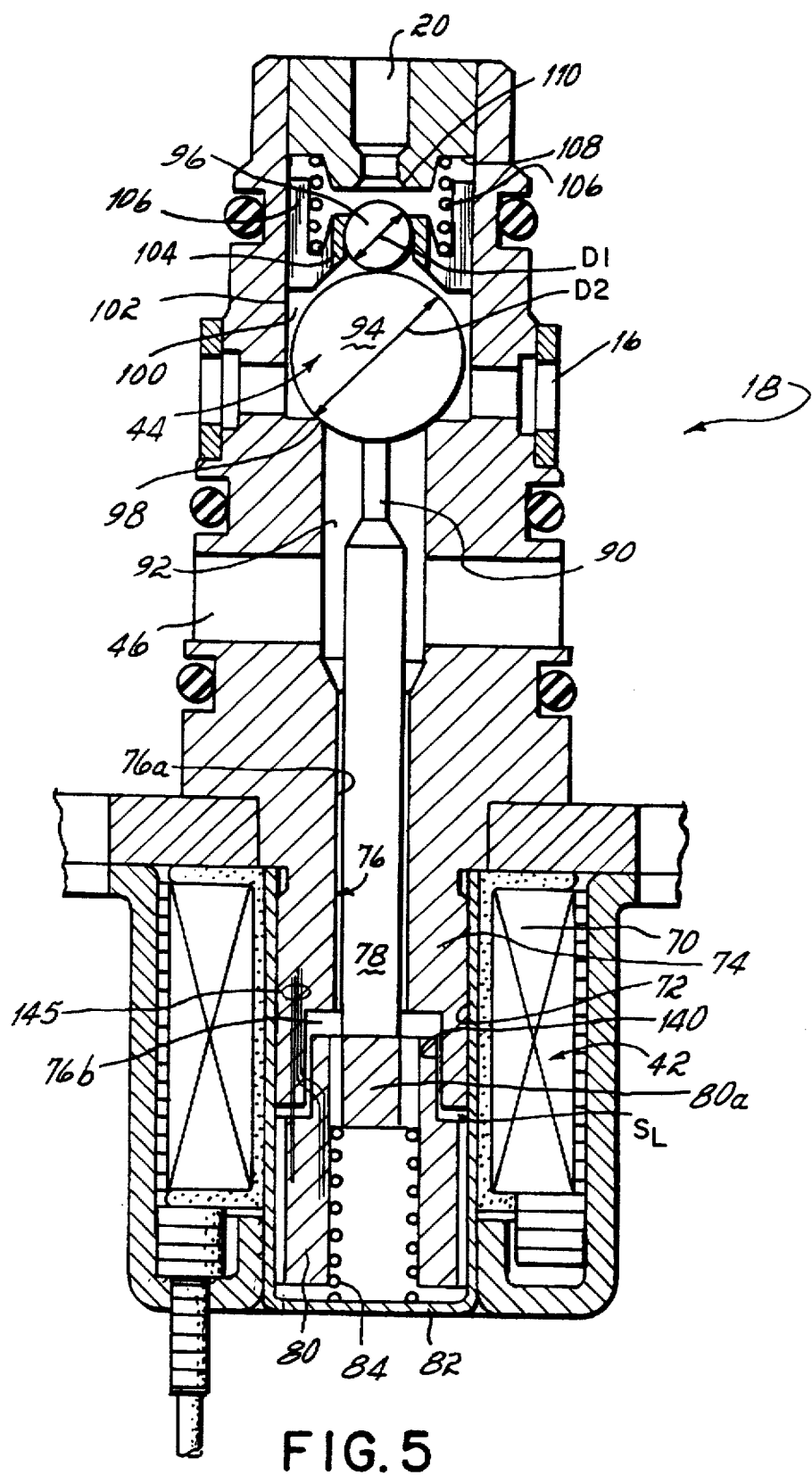
FIG. 5 shows another embodiment of the valve arrangement with the armature of the electromagnet formed stepped shaped.

In this manner, the pressure in the fluid line 22 can be limited to a presettable value. FIG. 5 illustrates a further parameter for setting the forces that can be generated by the electromagnet arrangement 42. Here, advantage is taken of the effect of the so-called magnetic force shearing phenomenon. The magnetic forces are effective not only in the axial direction of the plunger armature but also transversely to it. As soon as the armature enters the shearing range, the axial force component is reduced by the then generated transverse force.

As shown in FIG. 5, the through-hole 76 is formed as a stepped hole 76a, 76b. The hollow cylindrical part formed at the plunger armature 78 is correspondingly provided with a step 140 at the side facing to the interior of the excitation coil 70 so that a tapering part 80a can extend into the portion 76b of the stepped hole.

Upon insertion, a portion of the magnetic flux is built-up in the transverse direction and does not contribute to the closing force of the valve. This means that the transverse force reduces the force available for keeping the valve closed in a predeterminable manner. Field lines identified by reference numeral 145 are so branched that the progressively increasing range of the magnetic force curve can be considerably dampened so that the magnetic force variation function can be shifted over the air gap into a range of relative constancy which is almost independent of the dimensional tolerance of the air gap.

In addition, the stepped design of the iron core 74 and the plunger armature 78 with its cylindrical extension 80, 80a reduces the cross-sectional area of the air gap, which enables the saturation of the magnetic circuit at lower current values. This also reduces the heating-up of the electromagnet arrangement 42. This measure also contributes to a reduction of the temperature sensitivity.

We claim:

1. A valve arrangement for a fluid brake circuit with anti-slip control, comprising a first, a second and a third fluid connection (16, 20, 46) of respective, predetermined flow cross-sections, a valve element (44) which is biased by a first spring arrangement (106) in a first position in which the first and second fluid connection (16, 20) are communicating via a flow path and the third fluid connection (46) is closed, and a valve actuating means (42, 78) including an electromagnet arrangement (42) by which the valve element (44) can be moved in order to assume a second position in which the first and third fluid connection (16, 46) are communicating via a flow path and the second fluid connection (20) is closed by the valve element, wherein in the second position of the valve element (44, 94, 96)

the bias exerted by the first spring arrangement (106) onto the valve element (44, 94, 96) and the flow cross-sections of the fluid connections (16, 20, 46) are so dimensioned, and the electromagnetic force adjustably exerted by the valve actuating means onto the valve element is so determined that with a predetermined fluid pressure at the second fluid connection (20) the valve element (44) opens the second fluid connection (20) to such an extent that a flow path is obtained to the first and third fluid connections (16, 46), characterized in that the valve element is formed of two balls (94, 96) of different diameters (D1, D2), the second fluid connection (20) is in fluid communication with a valve seat (110) of the smaller ball (96), and the third fluid connection (46) is in fluid communication with a valve seat (98) of the larger ball (96); the valve seat (98) of the ball (94) having the larger diameter (D2) has a larger free diameter than the valve seat (110) of the ball (96) having the smaller diameter (D1), and the valve actuating means (42, 78) and the two balls (94, 96) are coaxially aligned with respect to each other.

2. A valve arrangement according to claim 1, characterized in that the electromagnet arrangement (42) is formed by at least one excitation winding (70) which is connected with an iron core (74) which, via an adjustable air gap $S_L$ cooperates with an armature element (78, 80) through which the valve element (44) can be moved.

3. A valve arrangement according to claim 2, characterized in that upon the excitation of the electromagnet arrangement (42), the variation of the air gap $S_L$ occurs in a range in which the generated magnetic force changes at least approximately linearly.

4. A valve arrangement according to claim 2, characterized in that the plunger armature (78, 80) resides within a stepped hole (76a, 76b) in the iron core (74) and the plunger armature (78, 80) includes a correspondingly stepped portion (80a) whereby at least a section of the air gap $S_L$ of the electromagnet arrangement (42) has a stepped cross-sectional shape.

5. A valve arrangement according to claim 1, characterized in that the electromagnet arrangement (42) can be operated in the magnetic saturation.

6. A valve arrangement according to claim 1, characterized in that the resilient bias exerted by the first spring arrangement (106) on the valve element (44), the force that can be applied to the valve element (44), by the valve actuating means (42), and the flow cross-sections of the fluid connections (16, 20, 46) are so dimensioned that with a pressure difference of approx. 60 bar between the second (20) and the first or third fluid connection (16, 46) a flow path is obtained to the first and/or the third fluid connection (16, 46).

7. A valve arrangement according to claim 6, characterized in that the force generated by the valve actuating means (42, 78) is applied to the ball (94) with the greater diameter D2.

8. A valve arrangement according to claim 1, characterized in that the valve actuating means (42) is formed as a pot coil (70) with an iron core (74) and a plunger armature (78, 80).

9. A valve arrangement according to claim 8, characterized in that the plunger armature (78, 80) is biased in the direction of the second position of the valve element (44) by a second spring arrangement (84), with the spring forces of the two spring arrangements (106, 84) being so dimensioned that with the unexcited valve actuating means the ball (94) with the greater diameter is not lifted off its valve seat (98).

10. A valve arrangement for a fluid brake circuit with anti-slip control, comprising a first, a second and a third fluid connection (16, 20, 46) of respective, predetermined flow cross-sections, at least one valve element (44) which is biased by a first spring arrangement (106) in a first position in which the first and second fluid connection (16, 20) are communicating via a flow path and the third fluid connection (46) is closed, and a valve actuating means (42) by which the valve element (44) can be moved in order to assume a second position in which the first and third fluid connection (16, 46) are communicating via a flow path and the second fluid connection (20) is closed by the valve element, characterized in that the bias of the first spring arrangement (106), the force that can be applied to the valve element (44) by the valve actuating means (42), and the flow cross-sections of the fluid connections (16, 20, 46) are so dimensioned that with a predetermined fluid pressure at the second fluid connection (20) the valve element (44) opens the second fluid connection (20) to such an extent that a flow path is obtained to the first and/or the third fluid connection (16, 46), the valve element being formed by two balls (94, 96) with different diameters D1, D2, the ball with the greater diameter D2 sealing the third fluid connection (46) and the ball (96) with the smaller diameter D1 sealing the second fluid connection (20).

* * * * *